(12) United States Patent
Von Wendorff

(10) Patent No.: US 6,959,595 B2
(45) Date of Patent: Nov. 1, 2005

(54) METHOD AND DEVICE FOR MONITORING THE PRESSURE IN A TIRE

(75) Inventor: Wilhard Christophorus Von Wendorff, München (DE)

(73) Assignee: Infineon Technologies AG, Munich (DE)

(*) Notice: Subject to any disclaimer, the term of this patent is extended or adjusted under 35 U.S.C. 154(b) by 68 days.

(21) Appl. No.: 10/436,431

(22) Filed: May 12, 2003

(65) Prior Publication Data

US 2003/0221481 A1 Dec. 4, 2003

(30) Foreign Application Priority Data

May 10, 2002 (EP) ............................................. 02010528

(51) Int. Cl.⁷ .............................................. B60C 23/02
(52) U.S. Cl. ..................................................... 73/146.3
(58) Field of Search ................................. 73/146, 146.3, 73/146.5, 146.8, 754; 340/442–447; 702/130

(56) References Cited

U.S. PATENT DOCUMENTS

| | | | | |
|---|---|---|---|---|
| 4,723,445 A | * | 2/1988 | Ripley et al. | ............... 73/146.3 |
| 4,748,845 A | * | 6/1988 | Rocco et al. | ............... 73/146.8 |
| 5,050,110 A | * | 9/1991 | Rott | ........................... 702/130 |
| 5,231,872 A | | 8/1993 | Bowler et al. | |
| 5,625,144 A | * | 4/1997 | Chang | ........................ 73/146.3 |
| 6,278,363 B1 | * | 8/2001 | Bezek et al. | ................ 340/442 |

* cited by examiner

*Primary Examiner*—William Oen
(74) *Attorney, Agent, or Firm*—Laurence A. Greenberg; Werner H. Stemer; Ralph E. Locher

(57) ABSTRACT

A tire pressure monitor and a method of measuring a pressure in a tire include a decision whether the tire pressure should be measured. The decision is made in dependence on a magnitude of a change in a signal which is output by a sensor which senses the pressure prevailing in the tire or the temperature prevailing in the tire. As a result it is possible to reduce the size and the weight of the components of a tire pressure monitor to be accommodated in the tire or in the rim to a minimum.

20 Claims, 1 Drawing Sheet

METHOD AND DEVICE FOR MONITORING THE PRESSURE IN A TIRE

BACKGROUND OF THE INVENTION

FIELD OF THE INVENTION

The present invention relates to a method of monitoring the pressure in a tire and to a device for monitoring the pressure in a tire. Devices for monitoring the pressure in a tire are also known under the designation tire pressure monitor.

In the context of this description, a tire whose pressure is to be monitored is the tire of a motor vehicle such as of a car, for example. Recently, increased efforts have been made to monitor the tire pressure of motor vehicle tires because a tire which has too little air or loses air may constitute a safety risk.

A variety of ways exist for monitoring tire pressure.

One of the possible ways is for the monitoring to be carried out taking into account the circumference of the tire. This is based on the knowledge that a tire with a low tire pressure has a smaller tire circumference than a tire with a high tire pressure, and that, given the same motor vehicle speed, a tire with a small circumference rotates at a higher rotational speed than a tire with a relatively large tire circumference.

As a result, from the fact that the rotational speed of a tire is higher or lower than the rotational speed of one or more other tires, it is possible to conclude that one or more tires do not have the desired tire pressure.

This method of monitoring is, on the one hand, easy to carry out because the sensors which are required for it are provided as standard equipment in modern motor vehicles. On the other hand, the detection of an excessively low tire pressure or a drop in tire pressure cannot be ensured under all circumstances, or can only be ensured with a disproportionately high degree of expenditure. In particular, it is difficult, or even impossible, to sense states or changes which occur simultaneously at a plurality of tires or at all the tires simultaneously.

For this reason, the tire pressure is monitored by providing pressure sensors in the tires, or more precisely in the rims on which they are fitted. Such pressure sensors sense the absolute pressure in the individual tires. Although this permits the tire pressure to be monitored in a way which is highly precise and functions under all circumstances, providing the pressure sensor and the other components of the tire pressure monitor which are to be accommodated in the rim can lead to other problems.

One of these problems is that the components of the tire pressure monitor which are to be accommodated in the tire or in the rim are so large that it is difficult to accommodate them in the tire or in the rim, and/or are so heavy that the tire becomes unbalanced as a result.

The largest and heaviest component of the components of the tire pressure monitor which are to be accommodated in the tire or in the rim is a battery which supplies energy to the components of the tire pressure monitor which are to be accommodated in the tire or in the rim.

As this battery cannot be changed, or can only be changed with a very large degree of outlay, it must have such a high capacitance that it lasts up to the end of the period of use of the motor vehicle, that is to say for at least 10 years.

However, as the battery is, on the other hand, to be as small and lightweight as possible for the above-mentioned reasons, it is necessary to look for possible ways of keeping the energy consumption of the components applied with energy by the battery as low as possible. A known and very effective measure for this is that the pressure of the tire is measured at shorter time intervals in phases wherein it is assumed that the tire is moving than in phases wherein it is assumed that the tire is not moving.

It is possible to detect whether the tire to be monitored is moving or not by means of an acceleration sensor, for example a centrifugal force sensor, which is accommodated in the tire or in the rim. However, such a centrifugal force sensor has a considerable weight and a considerable size so that the fact that the battery can be made smaller, made possible by the centrifugal force sensor, is at least partly canceled out again.

SUMMARY OF THE INVENTION

It is accordingly an object of the invention to provide a tire pressure monitor and a method of monitoring the pressure of a tire which overcomes the above-mentioned disadvantages of the heretofore-known devices and methods of this general type and which provides a possible way of reducing to a minimum the size and the weight of the components of the tire pressure monitor which are to be accommodated in the tire or in the rim.

With the foregoing and other objects in view there is provided, in accordance with the invention, a method of monitoring a pressure in a tire, which comprises:

sensing a pressure prevailing in the tire or a temperature prevailing in the tire and outputting a sensor output signal; and deciding whether the tire pressure is to be measured in dependence on a magnitude of a change in the sensor output signal.

The method according to the invention and the device according to the invention are distinguished by the fact that the decision as to whether the tire pressure is to be measured is taken as a function of the magnitude of the change in a signal which is output by a sensor which senses the pressure prevailing in the tire or the temperature prevailing in the tire.

If a tire loses air, the pressure prevailing in the tire and the temperature prevailing in the tire also inevitably change. Consequently, the change in the pressure prevailing in the tire or in the temperature prevailing in the tire is a reliable indicator of the fact that the tire could be losing air. The change in the pressure prevailing in the tire or in the temperature prevailing in the tire is thus a suitable occasion to measure the pressure prevailing in the tire.

The sensing of the change in the pressure prevailing in the tire or in the temperature prevailing in the tire can be carried out simply and with minimum consumption of energy. For this purpose, it is in particular not necessary to determine the absolute value of the pressure prevailing in the tire or the temperature prevailing in the tire, that is to say in particular there is no need for an analog/digital conversion of the sensor output signal, but rather it is sufficient to compare the sensor output signal with one or more threshold values.

As a result, the features of the invention enable the size and the weight of the tire monitor components to be accommodated in the tire or in the rim to be reduced to a minimum.

In accordance with an added feature of the invention, the sensor output signal is an analog signal.

The magnitude of the change in the sensor output signal, i.e., the gradient, is determined by comparing the sensor output signal with one or more threshold values.

In accordance with an additional feature of the invention, the at least one threshold value is an analog signal and the analog sensor output signal is compared with one or more analog threshold values.

In accordance with another feature of the invention, the device measures the tire pressure if the sensor output signal exceeds a specific threshold value. In the alternative, or in addition, the tire pressure is measured if the sensor output signal drops below a specific threshold value.

In accordance with again a further feature of the invention, the one or more threshold values are updated at regular or irregular intervals.

In accordance with again an added feature of the invention, the one or more threshold values are defined taking into account a result of a respective last measurement of the pressure prevailing in the tire or the temperature prevailing in the tire.

In accordance with again an additional feature of the invention, the sensor also measures the pressure prevailing in the tire or the temperature prevailing in the tire if the at least one threshold value has to be updated.

In accordance with yet again an additional feature of the invention, the time intervals at which updating of the at least one threshold value takes place are longer than the time intervals at which the magnitude of the change in the sensor output signal is determined.

In accordance with a concomitant feature of the invention, the tire pressure sensor outputs an analog signal, and the device includes an A/D converter in which the signal is subjected to analog/digital conversion.

Other features which are considered as characteristic for the invention are set forth in the appended claims.

Although the invention is illustrated and described herein as embodied in a method and device for monitoring the pressure in a tire, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

The method described below and the device described below are components of a tire pressure monitor wherein the tire pressure is determined using a pressure sensor, which are accommodated, together with further specific components of the tire pressure monitor, in the tire or the rim on which the tire is fitted.

However, it is already to be noted at this point that the particular features of the method described below and the device described below can also be used in any other desired tire pressure monitors wherein it is advantageous for the tire pressure monitor to carry out a quantitative determination of the tire pressure or of a variable which enables the tire pressure to be inferred, if there is a specific reason to do so.

The tires whose pressure is monitored by way of the method described herein and the device described below are the tires of a motor vehicle, for example of a passenger car or of a truck. The method described below and the device described below can, however, also be used to monitor the pressure of any other tires.

Figure 1:
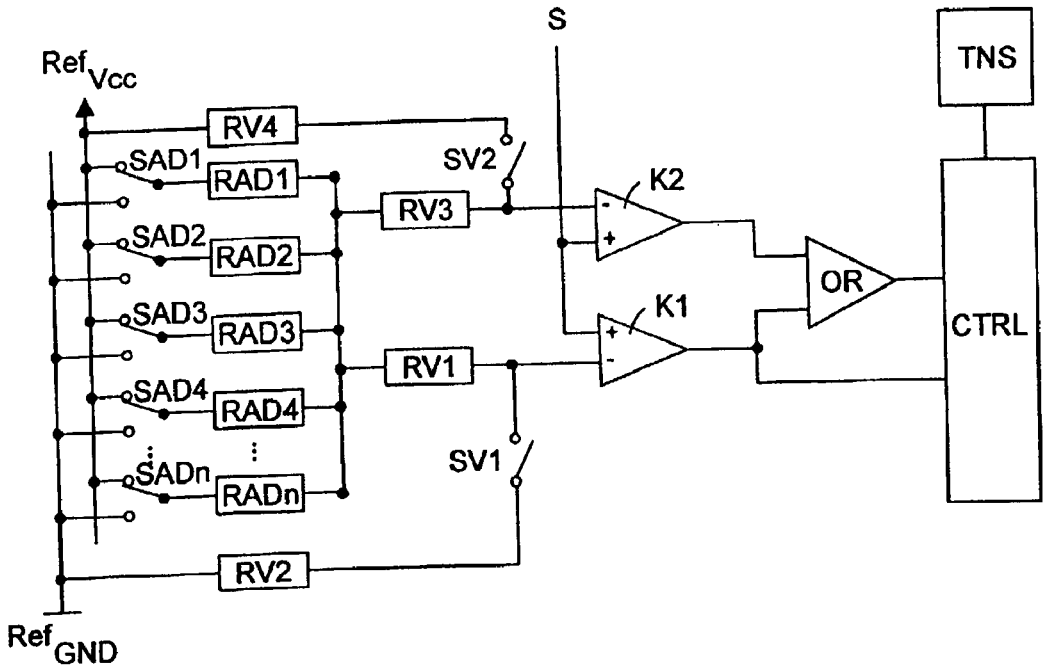
FIG. 1 is a block diagram illustrating the structure of a first exemplary embodiment of the tire pressure monitor according to the invention.

Referring now to the figures of the drawing in detail and first, particularly, to FIG. 1 thereof, there are illustrated those components of the tire pressure monitor, which in the exemplary embodiment are accommodated in the tire or in the rim on which the tire is fitted.

The configuration shown in FIG. 1 comprises a sensor S, resistors RAD1 to RADn, and RV1 to RV4, switches SAD1 to SADn, and SV1 and SV2, comparators K1 and K2, an OR gate OR, a control device CTRL and a transmitter device TNS.

The resistors RAD1 to RADn each have a first and a second terminal, the first terminals being optionally capable of being connected, via the switches SAD1 to SADn, inpendently of one another, either to an upper reference voltage $REF_{VCC}$ or a lower reference voltage $REF_{GND}$, and the second terminals being connected to one another. The second terminals, connected to one another, of the resistors RAD1 to RND1 are connected to a first input terminal of the first comparator K1 via the resistor RV1, and to a first input terminal of the second comparator K2 via the resistor RV3. The first input terminal (inverting input) of the first comparator K1 is also connectible to the lower reference voltage $REF_{GND}$ via the switch SV1 and the resistor RV2 connected in series with it. The first input terminal (inverting input) of the second comparator K2 is also connectible to the upper reference voltage $REF_{VCC}$ via the switch SV2 and the resistor RV4 connected in series with it. In each case the (analog) output signal of the sensor S is fed to the second input terminals (non-inverting input) of the comparators K1 and K2. The comparators K1 and K2 compare the signals supplied to them and output the comparison results to the OR gate OR. The OR gate OR subjects the signals fed to it to an OR operation and outputs the result to the control device CTRL. The output signal of the first comparator K1 is also fed to the control device CTRL. The control device CTRL carries out specific operations as a function of the signal fed to it. These operations include the activation and deactivation of the configuration shown in FIG. 1, the control of the switches SAD1 to SADn and SV1 to SV4 as well as the wireless transmission of signals and data by the transmitter device TNS to an external controller (accommodated in the motor vehicle).

Which operations are carried out when will be described later in more detail.

The resistors RAD1 to RADn are dimensioned in such a way that, where i=1, 2 . . . n, the resistance of RADi is twice as large as the resistance of RADi-1.

The resistors RV1 to RV4 are dimensioned in such a way that when switches SV1 and SV2 are opened, no voltage or only a negligibly small voltage drops across the resistors RV1 and RV3, so that the voltage which is fed to the second input terminals of the comparators K1 and K2 is essentially the voltage which is obtained at the second terminals, connected to one another, of the resistors RAD1 to RADn, and when the switches SV1 and SV2 are closed, the voltage which is fed to a second input terminal of the comparator K1 is pulled downward to a desired degree, and the voltage which is fed to the second input terminal of the comparator K2 is pulled upward to a desired degree.

In the exemplary embodiment, the resistors RV1 to RV4 are dimensioned in such a way that the resistance of RV1 and RV3 is equal to the resistance of RAD1, and that the resistances of RV2 and RV4 are in each case 64 times the resistance of RAD1.

It is expressly pointed out that the aforesaid dimensioning of the resistors is only an example. The resistors can also in principle have any other desired size relationships.

The components of the tire pressure monitor, which, in the example in question, are accommodated in the tire or in the rim on which the tire is fitted, also include a battery.

The components of the tire pressure monitor which are mentioned above are provided in all the tires or rims whose pressure is to be monitored.

The configuration shown in FIG. 1 carries out comparisons at specific time intervals which are referred to below as first time intervals, by means of which comparisons it is checked whether the analog output signal of the sensor S is within a range which is defined by a first threshold value and a second threshold value. In the example in question, the first time intervals are constant time intervals for a length of 1 minute. As will be understood more precisely below, there is no absolute necessity for the first time intervals to be constant; furthermore, they can also be shorter or longer than 1 minute.

Furthermore, the assembly shown in FIG. 1 carries out, at specific time intervals which are referred to below as second time intervals, a determination of the pressure of the tire whose pressure is to be monitored. These pressure measurements, referred to below as first pressure measurements, are each composed of an analog/digital conversion of the analog signal which is output by the sensor S. The threshold values with which the analog signal of the sensor is compared in the comparisons mentioned above are updated on the basis of these first pressure measurements. In the example in question, the second time intervals are constant time intervals with a length of 30 minutes. As will be understood more precisely below, there is no absolute necessity for the second time intervals to be constant; furthermore, they may also be shorter or longer than 30 minutes.

If it is determined in the comparisons mentioned above that the output signal of the sensor S lies outside the range defined by the threshold values, a signal which is referred to below as a wake-up signal is generated, the control device CTRL bringing about and evaluating one or more pressure measurements when the signal occurs. These pressure measurements, referred to below as second pressure measurements, are each composed, like the first pressure measurements mentioned above, of an analog/digital conversion of the analog signal which is output by the sensor S. The control device evaluates the results of the second pressure measurements, specifically only the results of the second pressure measurements, and decides whether there are indications of a tire pressure or tire pressure profile which is not in accordance with the regulations. A tire pressure or tire pressure profile which is not in accordance with the regulations is present in particular if the tire pressure is too low or too high or if changes in tire pressure which are due to a possible tire defect are present. The control device CTRL takes into account here the fact that, when the motor vehicle is traveling, a tire pressure or a change in tire pressure is frequently obtained which is only of temporary nature and which is not due to a faulty state which is to be eliminated; such changes (which are not to be taken into account) in the tire pressure occur, for example, when uneven surfaces are traveled over or when there are fluctuations in the ambient temperature. For this reason, the control device CTRL preferably brings about a plurality of pressure measurements, for example five; by evaluating this plurality of second measurements, it is possible to determine whether or not a tire pressure or tire pressure profile which appears not to be in accordance with the regulations is of permanent nature, that is to say whether it is actually not in accordance with the regulations. If the control device CTRL determines, during the checking carried out by it, a tire pressure or tire pressure profile which is not in accordance with the regulations, it transmits data representing the tire pressure or tire pressure profile which is not in accordance with the regulations, and/or other information, to the external control device already mentioned above, by means of the transmitter device TNS. Alternatively, it would also be possible to provide for the control device CTRL to transmit in principle all the results of the second pressure measurements to the external control device and to leave the evaluation of the measurement results to said device.

The analog/digital converter which is used to carry out the first and second tire pressure measurement includes, in the example in question, the switches SAD1 to SADn, the resistors RAD1 to RADn, the first comparator K1 and part of the control device C. It is an analog/digital converter which operates according to the principle of successive approximation. That is to say the control device CTRL changes the position of the switches SAD1 to SADn until the voltages which are present at the input terminals of the first comparator K1 are the same or virtually the same in size. However, it is already pointed out at this point that the analog/digital conversion could also be carried out using any other analog/digital converter, for example using a sigma-delta converter or a voltage/frequency converter. After the completion of the analog/digital conversion, the switches SAD1 to SADn are either kept in the state wherein they were when the analog/digital conversion was completed, or the respective switch positions are stored in the control device CTRL. The switches SV1 and SV2 are opened while the analog/digital conversion is being carried out. The resistor RV1 which is not associated with the analog/digital converter does not influence the analog/digital conversion because no current, or only a negligibly small current, flows via said resistor RV1 owing to the high input resistance of the comparator K1, and consequently it is also the case that no voltage, or only a negligibly small voltage, drops across it.

In order to carry out the comparisons mentioned above, the analog/digital converter, and additionally the switches SV1 and SV2, the resistors RV1 to RV4, the comparator K2 and the OR gate OR are required. In the comparisons, the switches SAD1 to SADn occupy the position which they were in at the end of the last analog/digital conversion carried out, and the switches SV1 and SV2 are closed. The closed switches SV1 and SV2 ensure that the voltages which are present at the first input terminals of the comparators K1 and K2 are higher or, respectively, lower than is the case if the switches are opened (as when an analog/digital conversion is carried out). To be more precise it is the case that the voltage which is fed to the first input terminal of the second comparator K2 is increased by the resistor RV4 which acts as a pull-up resistor, and that the voltage which is fed to the first input terminal of the first comparator K1 is reduced by the resistor RV2 which acts as a pull-down resistor. The voltage which is fed to the first input terminal of the comparator K2 is the first threshold voltage which has already been mentioned at the beginning, and the voltage which is fed to the first input terminal of the comparator K1 is the second threshold voltage which was already mentioned at the beginning. The comparator K2 compares the analog output voltage of the sensor S with the first threshold voltage and outputs a voltage which represents a high level, if the analog output voltage of the sensor S is higher than the first threshold voltage. The comparator K1 compares the analog output voltage of the sensor S with the second threshold voltage and outputs a voltage which represents a high level, if the analog output voltage of the sensor S is lower than the second threshold voltage. The OR gate OR which is connected downstream of the comparators K1 and K2 outputs a voltage which represents a high level, if the analog output voltage of the switch S is higher than the first threshold voltage or lower than the second threshold voltage, that is to say if the analog output voltage of the sensor S lies outside a range which is defined by the first threshold voltage and by the second threshold voltage. The output signal of the OR gate OR is the wake-up signal which has already been mentioned at the beginning. If the wake-up signal has a voltage which represents a high level, it wakes up the part of the control device C which is responsible for bringing about, evaluating and transmitting the second pressure measurements; this part of the control device C is normally in a sleep mode wherein it uses up no energy, or a particularly small amount of energy. If, and for as long as, the wake-up signal has a voltage which represents a low level, the respective part of the control device C remains in the sleep mode.

The threshold voltages are adapted to the respectively prevailing conditions by the first pressure measurements which take place regularly. This makes it possible to prevent a situation wherein the wake-up signal has already been generated when the external conditions change. For example, no wake-up signal is generated if the tire pressure rises gradually owing to a rise in the external temperature or the temperature of the underlying surface.

However, the threshold voltages are preferably defined in such a way that, when uneven parts of the underlying surface are traveled over, a wake-up signal is generated.

It is additionally also possible to use the second pressure measurements to adapt the threshold voltages. Under certain circumstances it even proves advantageous if only the second pressure measurements are used to adapt the threshold voltages; in this case, it would be possible to dispense with carrying out the first pressure measurements.

In the phases wherein neither a first or a second pressure measurement nor a comparison is carried out, all the components of the configuration which is shown in FIG. 1 which are not required in these phases are deactivated or at least placed in an operating mode wherein they consume as little energy as possible. This may be carried out, for example, by virtue of the fact that the supply voltages for these components are separated from the supply voltage source. This also applies to the components of the control device CTRL which are respectively not required. In this context, it is to be noted that the control device CTRL is preferably composed of modules which can be operated independently of one another, it being possible for these modules to be a component of a single component (chip) or of various components (chips).

As is apparent from the explanations above, at least large parts of the configuration shown in FIG. 1 may be inactive both when the vehicle is traveling and when the vehicle is stationary. Even the operations of the configuration which are carried out most frequently, specifically the comparisons, are carried out only at time intervals of greater or lesser duration, and additionally consume relatively little energy, at any rate considerably less energy than when an analog/digital conversion is carried out. The analog/digital conversions which require more energy are carried out much less often than the comparisons, and in particular also much less often than in conventional tire pressure monitors; in conventional tire pressure monitors, analog/digital conversions are carried out continuously when the vehicle is traveling without time intervals, or in only very brief time intervals.

Although the tire pressure monitor described above consumes much less energy than conventional tire pressure monitors, it can detect a tire pressure or tire pressure profile which is not in accordance with the regulations even when the motor vehicle is stationary. This is possible because the aforementioned comparisons are carried out even when the vehicle is stationary, and consequently—after the occurrence of a wake-up signal—the execution and evaluation of a tire pressure measurement can be brought about even when the motor vehicle is stationary. As a result, it is possible, for example, to detect when a tire is burst and to trigger the alarm system in response thereto. In conventional tire pressure monitors this is not possible because tire pressure measurements are carried out in said monitors only when the motor vehicle is moving.

It is apparent that the tire pressure monitor described above can also be implemented differently from the configuration shown in FIG. 1. One of the possible variants is shown in FIG. 2.

Figure 2:
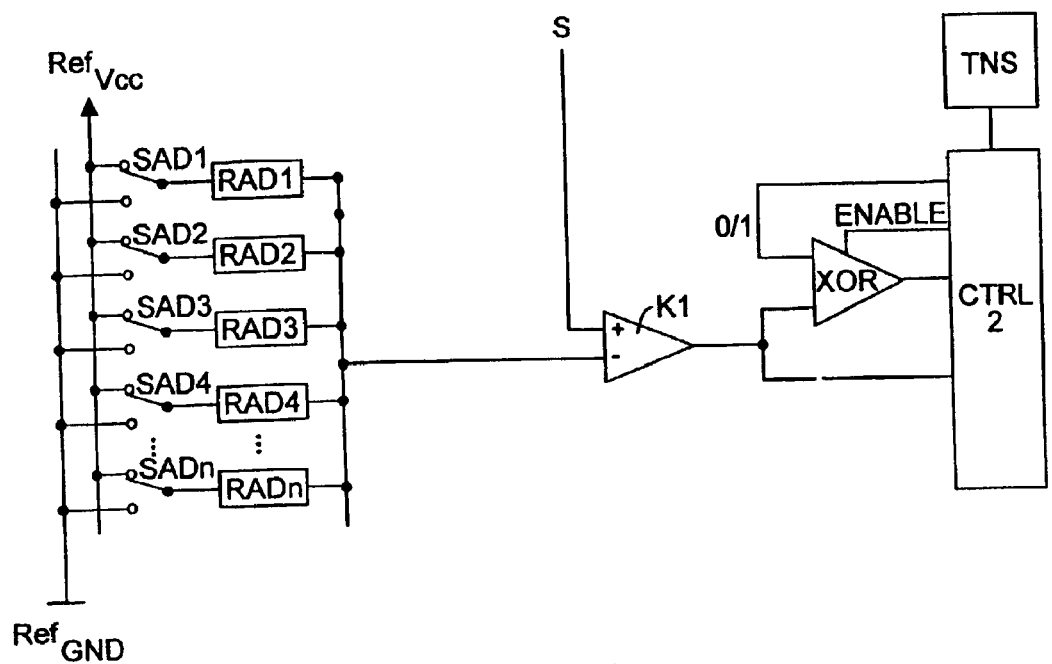
FIG. 2 is a block diagram of the structure of a second exemplary embodiment of the tire pressure monitor.

The system shown in FIG. 2 is composed only of an analog/digital converter, an XOR gate XOR, a control device CTRL2 and a transmitter device TNS. The analog/digital converter is composed of switches SAD1 to SADn, resistors RAD1 to RADn and a comparator K1.

Those components of the configuration shown in FIG. 2, which are provided with reference symbols shown in FIG. 1, are identical components, or components which correspond to one another.

The configuration shown in FIG. 2 carries out, like the configuration shown in FIG. 1, comparisons and first and second pressure measurements at specific time intervals and in response to specific events. In this respective there is no difference from the configuration shown in FIG. 1. The "only" difference is the way wherein the comparisons are carried out and the wake-up signal is generated.

The comparison of the analog output signal of the sensor S with the upper threshold voltage and the comparison of the analog output signal of the sensor S with the lower threshold voltage are carried out in successive steps by means of the comparator K1.

In both cases, the threshold voltages are generated by corresponding actuation of the switches SAD1 to SADn. The starting point here are the switch positions which the switches SAD1 to SADn had at the end of the analog/digital conversion which was respectively carried out last.

These switch positions are changed during the comparison of the analog output signal of the sensor S with the first threshold voltage to the effect that the voltage which occurs at the second terminals, connected to one another, of the resistors RAD1 to RADn is higher by a specific amount than would be the case without the modifications in the switch positions. By means of a modification in the switch position, through which the sum of the resistors whose first terminal is connected to the upper reference voltage $Ref_{VCC}$ is increased by the resistance of RV4 of the configuration shown in FIG. 1, it is possible to ensure that approximately the same threshold voltage is fed to the comparator K1 as to the comparator K2 in the configuration shown in FIG. 1.

The same applies to the comparison of the analog output signal of the sensor S with the second threshold voltage. In this case, the positions of the switches SAD1 to SADn are changed to the effect that the voltage which occurs at the second terminals, connected to one another, of the resistors RAD1 to RADn is lower by a specific amount than would be the case without the modification in the switch positions. By means of a modification in the switch position, through which the sum of the resistors whose first terminal is connected to the lower reference voltage $Ref_{GND}$ is increased by the resistance of RV2 of the configuration shown in FIG. 1, it is possible to ensure that approximately the same threshold voltage is fed to the comparator K1 as is fed to the comparator K1 of the configuration shown in FIG. 1.

The way wherein the switches SAD1 to SADn have to be actuated to generate such threshold values should be clear and not require any further explanation. The switches SAD1 to SADn are actuated by means of the control device CTRL2.

In the example in question it is the case that, when a comparison is carried out, the analog output voltage of the sensor S is firstly compared with the first threshold voltage. For this purpose, the switches SAD1 to SADn are actuated in such a way that the first threshold voltage is fed to the comparator K1. Furthermore, a voltage which represents a low level (0) is fed to the input terminal, which is not connected to the comparator K1, of the XOR gate XOR by the control device CTRL2. The comparator K1 outputs a voltage which represents a low level, like the comparator K2 of the configuration which carries out the corresponding comparison according to FIG. 1, if the analog output voltage of the sensor S is lower than the first threshold voltage, and outputs a voltage which represents a high level if the analog output voltage of the sensor S is higher than the first threshold voltage. If the comparator K1 outputs a voltage which represents a low level, the XOR gate XOR also outputs a voltage which represents a low level. As the output signal of the XOR gate XOR is the wake-up signal in the configuration shown in FIG. 2, in this case no second pressure measurements are brought about or evaluated. Otherwise, i.e. if the comparator K1 outputs a voltage which represents a high level, the XOR gate XOR also outputs a voltage which represents a high level. Thereupon, the control device CTRL2 brings about an evaluates one or more second pressure measurements.

After the comparison of the analog output signal of the sensor S with the first threshold voltage, the analog output voltage of the sensor S is compared with the second threshold voltage. For this purpose, the switches SAD1 to SADn are actuated in such a way that the second threshold voltage is fed to the comparator K1. Furthermore, a voltage which represents a high level (1) is fed to the input terminal, which is not connected to the comparator K1, of the XOR gate XOR by the control device CTRL2. The comparator K1 outputs a voltage which represents a low level if the analog output voltage of the sensor S is lower than the second threshold voltage, and outputs a voltage which represents a high level if the analog output voltage of the sensor S is higher than the second threshold voltage. If the comparator K1 outputs a voltage which represents a high level, the XOR gate XOR outputs a voltage which represents a low level, as a result of which in this case no second pressure measurements are brought about or evaluated. Otherwise, i.e. if the comparator K1 outputs a voltage which represents a low level, the XOR gate XOR outputs a voltage which represents a high level. The control device CTRL2 then brings about and evaluates one or more second pressure measurements.

As a result, the configuration shown in FIG. 2 consequently behaves precisely like the configuration shown in FIG. 1. The configuration shown in FIG. 2 is however easier to implement than the configuration shown in FIG. 1.

During the comparisons in the tire pressure monitors described above, it will be checked whether the output signal of a pressure sensor was within a range defined by the threshold voltages. However, there is no restriction to this. It would also be possible to provide instead that it is checked whether the analog output signal of a temperature sensor which senses the temperature prevailing in the tire lies within a range defined by threshold voltages. Changes in the pressure prevailing in the tire automatically result in a change in the temperature prevailing in the tire so that the comparison of the analog output signal of a pressure sensor with one or more threshold values and the comparison of the analog output signal of a temperature sensor with one or more threshold values are alternatives of equal value.

There is also no absolute necessity to check whether the analog output signal of the pressure sensor or temperature sensor lies within a range which is defined by two threshold values. It is also possible to provide for the operation to be carried out with only one threshold value and for a (second) pressure measurement to be brought about if the analog output signal of the pressure or temperature sensor drops below this threshold value.

The method described above and the device described above make it possible, independently of details of the practical implementation, to reduce to a minimum the size and the weight of the components of a tire pressure monitor which are to be accommodated in the tire or in the rim.

I claim:

1. A method of monitoring a pressure in a tire, which comprises:
   sensing a pressure prevailing in the tire or a temperature prevailing in the tire and outputting a sensor output signal based on the pressure or temperature;
   determining a magnitude of change in the sensor output signal by comparing the sensor output signal with at least one threshold value; and
   deciding whether the tire pressure is to be measured as a function of the magnitude of change in the sensor output signal.

2. The method according to claim 1, wherein the sensor output signal is an analog signal.

3. The method according to claim 1, wherein the at least one threshold value is an analog signal and the comparing step comprises comparing the analog sensor output signal with the analog threshold value.

4. The method according to claim 1, which comprises measuring the tire pressure if the sensor output signal exceeds a specific threshold value.

5. The method according to claim 1, which comprises measuring the tire pressure if the sensor output signal drops below a specific threshold value.

6. The method according to claim 1, which comprises updating the at least one threshold value at regular or irregular intervals.

7. The method according to claim 1, which comprises defining the at least one threshold value taking into account
   a result of a respective last measurement of the pressure prevailing in the tire or the temperature prevailing in the tire.

8. The method according to claim 1, which comprises also measuring the pressure prevailing in the tire or the temperature prevailing in the tire if the at least one threshold value has to be updated.

9. The method according to claim 6, which comprises setting the time intervals for updating the at least one threshold value to longer than time intervals required for determining the magnitude of the change in the sensor output signal.

10. The method according to claim 1, wherein a measurement of the tire pressure includes an analog/digital conversion of the signal output by a tire pressure sensor.

11. A device for monitoring a pressure in a tire, which comprises:

a sensor for sensing a pressure prevailing in the tire or a temperature prevailing in the tire, said sensor outputting a sensor output signal as a function of the prevailing pressure or temperature;

means for determining a magnitude of a change in the sensor output signal;

said means for determining the magnitude of the change in the sensor output signal being configured to determine the magnitude of the change by comparing the sensor output signal with one or more threshold values; and means for deciding whether the tire pressure is to be measured as a function of the magnitude of the change in the sensor output signal.

12. The device according to claim 11, wherein said sensor is an analog sensor outputting an analog signal.

13. The device according to claim 11, wherein the at least one threshold value is an analog signal and said means is configured to compare the analog sensor output signal and the analog threshold value with one another.

14. The device according to claim 11, wherein the device is enabled to measure the tire pressure if the sensor output signal exceeds a specific threshold value.

15. The device according to claim 11, wherein the device is enabled to measure the tire pressure if the sensor output signal drops below a specific threshold value.

16. The device according to claim 11, wherein the one or more threshold values are updated at regular or irregular intervals.

17. The device according to claim 11, which comprises means for defining the one or more threshold values taking into account a result of a respective last measurement of the pressure prevailing in the tire or the temperature prevailing in the tire.

18. The device according to claim 11, wherein said sensor measures the pressure prevailing in the tire or the temperature prevailing in the tire if the at least one threshold value has to be updated.

19. The device according to claim 16, wherein the time intervals at which updating of the at least one threshold value takes place are longer than the time intervals at which the magnitude of the change in the sensor output signal is determined.

20. The device according to claim 11, wherein a tire pressure sensor outputs an analog signal, and the signal is subjected to analog/digital conversion.

* * * * *